United States Patent Office 3,042,588
Patented July 3, 1962

3,042,588
PROCESS FOR PRODUCING COBALAMIN-PEPTIDE COMPLEXES
John Godfrey Heathcote, Grange Park, St. Helens, England, assignor to The Distillers Company Limited, Edinburgh, Scotland, a British company
Filed Mar. 26, 1958, Ser. No. 724,109
Claims priority, application Great Britain Apr. 4, 1957
4 Claims. (Cl. 195—80)

The present invention relates to cobalamin-peptide complexes and to their production and recovery.

It is already known that cyanocobalamin and other cobalamins in which the cyano radical is replaced by another radical, such as, for example, hydroxocobalamin, are of considerable therapeutic value in the treatment of pernicious anaemia, particularly when administered to patients parenterally, but that they are much less effective when taken orally.

In view of this it has been postulated that the presence of another substance, often known as the "intrinsic factor" is required in cases of pernicious anaemia before effective absorption of such orally administered cobalamins can take place. From the literature on the subject it appears generally to be thought that this factor must be of a proteinaceous nature and of high molecular weight, and to be effective, capable of binding the cobalamin to prevent its destruction in the digestive tract and thus to enhance its absorption by the body.

Various attempts have been made to isolate a suitable high molecular weight substance from animal sources which has "intrinsic factor" activity; for example extracts of hog gastric mucosa have been used with cyanocobalamin. The clinical results obtained are not entirely satisfactory, however. Other oral treatments of pernicious anaemia are the use of relatively large amounts of raw liver extracts or of cyanocobalamin itself. Treatment, therefore, of the condition is, at present, almost exclusively by injection with all its dangers and inconveniences. Furthermore, the preparation of injectable material is relatively difficult and expensive.

It is an object of the present invention to provide an improved cobalamin-containing product which when orally administered is effective against pernicious anaemia.

It is a further object of the invention to provide processes for the production of such products.

Accordingly, the present invention comprises a cobalamin-peptide complex resulting from the degrading of a cobalamin-containing product of microbial fermentation until it becomes effective on oral administration against pernicious anaemia.

By the term "cobalamin peptide complex" is meant a substance comprising a peptide group linked to a cobalamin group as hereinafter defined, or a mixture of such substances.

It is not necessary for the clinical use of the present invention that the complex of the invention should be isolated although such isolation is preferable. The invention therefore also comprises, in addition to the production of the complexes, the production of preparations containing them.

The cobalamin group of the complex may be cyanocobalamin, that is vitmain B12 or a cobalamin which can be converted to cyanocobalamin by the action of cyanide ions, for example hydroxocobalamin, that is vitamin $B12_b$, or a cobalamin which differs from the above cobalamins in the substituents on the benzene ring of the benzimidazole portion of the group, for example the 5-hydroxy-benzimidazole derivative, also known as Factor III or a cobalamin in which the benzimidazole portion of the molecule is replaced by a naphthimidazole.

The cobalamin must also be nontoxic and effective against pernicious anaemia when administered parenterally.

In order to be effective against pernicious anaemia when given orally the cobalamin peptide complex (or in general, the individual compounds of which the complex is a mixture) should have a molecular weight of less than about 15,000.

The molecular weight may be determined by the use of known techniques, for example measurement of the sedimentation constant in an ultra-centrifuge; by diffusion; by the property of dialysing through semi-permeable membranes of known pore size or by measurements of the ratio of the weight of the cobalamin group and the peptide group in the complex, for example as hereinafter described. As the molecular weight of cyanocobalamin itself is 1350 the cobalamin peptide complexes of the present invention will usually have a molecular weight above about 2000, although complexes of lower molecular weight, for instance about 1500 may also be effective in the oral treatment of pernicious anaemia. The preferred molecular weight range is from 2,000 to 11,000.

That complexes prepared according to the invention have relatively low molecular weights is shown by the dialysis test now described.

On dialysis a quantity of complex derived from a culture of Streptomyces ATCC 11072 as described in Example 1 was shown to pass through a "cellophane" membrane having an average pose size of 24 Angstrom units against water but it did not pass through the membrane against an aqueous solution of ammonium sulphate containing 60 parts by weight of salt to 100 parts by weight of water. Cyanocobalamin itself, at about the same concentration, passed freely through the membrane against an aqueous solution of ammonium sulphate of the same concentration.

Samples of the cyanocobalamin-peptide complexes prepared by the methods described in Examples 1 to 5 were examined to determine the weights of cyanocobalamin and of peptide in the complexes. Assuming a molecular ratio of cyanocobalamin to peptide of 1:1 and a molecular weight of 1350 for cyanocobalamin, molecular weights for the complexes are as shown in the following table:

| Complex Number, HPP | Prepared as in Example— | Content of Cyanocobalamin, Percent w./w. | Content of Peptide, percent w./w. | Calculated Molecular Weight |
|---|---|---|---|---|
| 1 | 1 (Streptomyces ATCC 11072). | 5.5 | 37.6 | 10,500 |
| 4 | 3 (Propionibacterium freudenreichii). | 13.2 | 86.8 | 10,250 |
| 4A | 3 (After acetone precipitation). | 15.8 | 84.2 | 8,600 |
| 5 | 4 (Streptomyces ATCC 11072). | 14.1 | 85.9 | 9,550 |
| 5A | 4 (After acetone precipitation). | 29.3 | 70.7 | 4,600 |
| 7 | 5 (Propionibacterium freudenreichii). | 13.4 | 67.5 | 8,100 |

Other characteristic properties possessed by the complexes of the invention include their behaviour on hydrolysis under acid and alkaline conditions and their absorption spectra when examined by light having a wavelength in the visible and ultra-violet range. These properties will now be described.

On hydrolysis in 6 N hydrochloric acid in a sealed tube for 24 hours, a cyanocobalamin-peptide complex derived from the Streptomyces ATCC 11072 fermentation as described in Example 1 was shown by paper chromatography, using developing solvents such as phenol/ammonia and butanol/acetic acid/water, to contain residues of the following amino acids, glutamic and aspartic acids, glycine, valine, proline, arginine, cysteine or cystine, serine, alanine, leucine, isoleucine, phenylalanine, lysine, histidine and threonine. After alkaline hydrolysis in the presence of barium hydroxide tryptophane was shown to be present.

The same amino acid residues were also shown to be present by a similar method in the cobalamin-peptide complex derived from *Propionibacterium freudenreichii* as described in Example 2.

Figure 1:
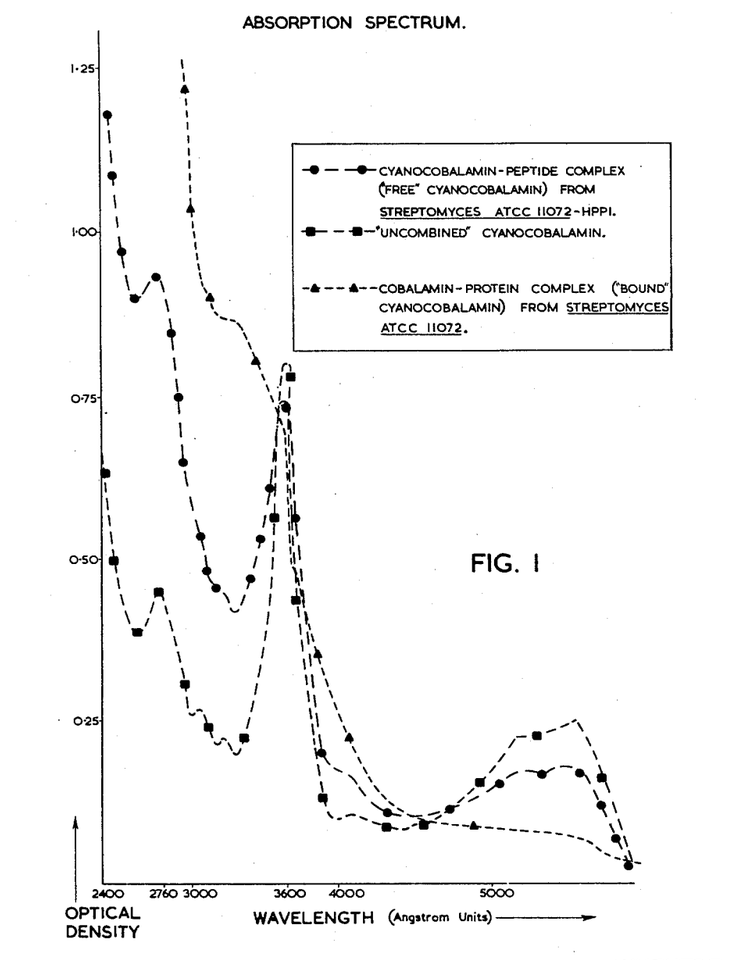
Figure 2:
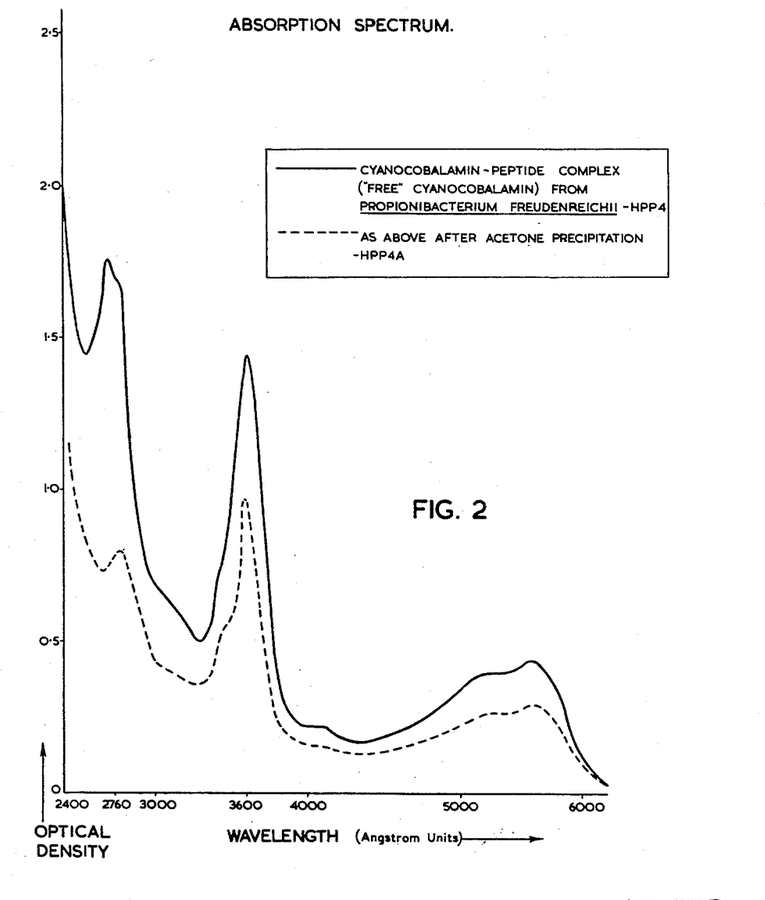
Figure 3:
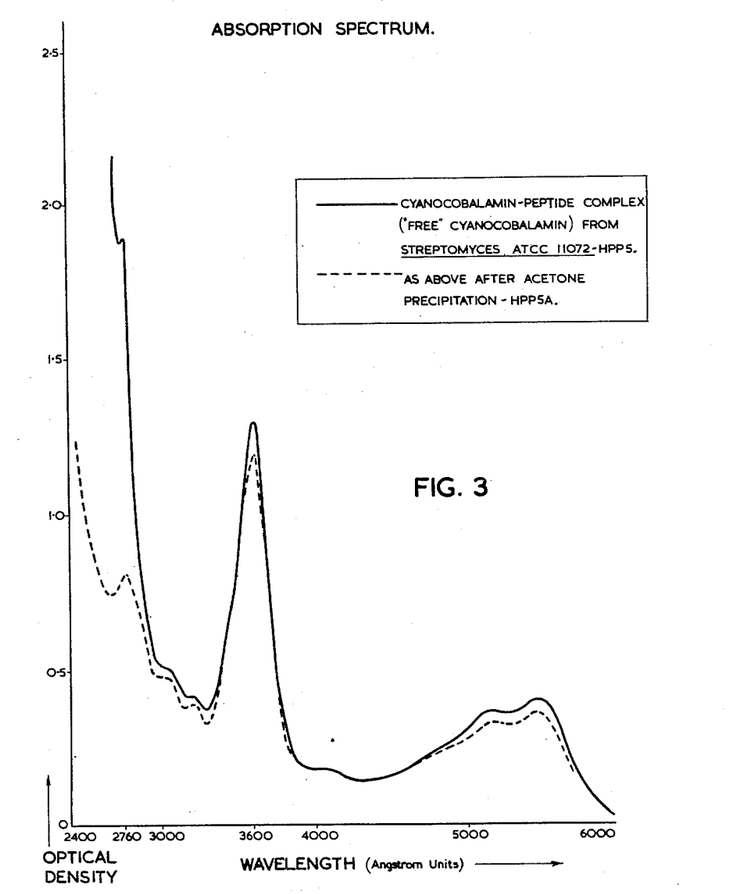

Examination of the cyanocobalamin-peptide complexes prepared by the methods described in Examples 1 to 5 has been carried out by means of spectroscopy using light having a wave-length in the visible and ultra violet range. The absorption spectra of some of these complexes are shown in FIGURES 1 to 3 of the drawings accompanying specification.

It is desirable, when producing preparations containing the complexes of the present invention from the broth or mixture resulting from fermentation, to include one or more steps of concentration and purification of the material, and it is preferable to isolate the complex in substantially pure form. In view of the clinical effectiveness of the complex, which results in an amount of material containing some 10 micrograms of cobalamin being in many cases an adequate dose; not only the pure material but also even moderately concentrated material contains too much of the complex for convenient oral administration. It is therefore preferred to prepare these complexes for use by admixture of the pure complex, or of a purified concentrate containing the complex, with non-toxic solid or liquid diluents. By non-toxic is of course meant, non-toxic in the quantities which will be required in clinical use.

Mannitol has been found to be suitable as a solid diluent but other non-toxic solids such as starch or dibasic calcium phosphate may be used if desired. The complex may conveniently be suspended or dissolved in water or other liquids containing, if desired, stabilising agents, for example buffering agents.

It is advantageous when the preparation is in liquid form to include therein sweetening or other flavouring agents to increase its palatability. Suitably purified material, however, may be used without such inclusions, whilst solid preparations may take the form of tablets or capsules, thus reducing the need for flavouring. In all cases, there may be included other therapeutically-active substances provided of course that these are chemically compatible with cobalamins and with peptides.

Any suitable materials may be added for flavouring or generally rendering the preparation more platable since it is intended for oral administration. Such materials include sugar or other sweetening agents and fruit flavourings.

The clinical results actually obtained by oral administration of complexes prepared as described in Examples 1 to 5 are shown graphically in FIGURES 4 to 10 of the drawings accompanying this specification. These results show that after an initial dose of the complex containing about 100 micrograms of cyanocobalamin daily for a period of 7 to 8 days, patients suffering from pernicious anaemia are maintained in good health and without symtoms of the disease through the periods of the trials, on a daily oral dose of the complex containing between about 10 and 20 micrograms of cyanocobalamin.

The clinical results show that the cobalamin-peptide complexes of the present invention can be extremely effective in the oral treatment of pernicious anaemia particularly in doses which contain substantially the same amount of cyanocobalamin as that which would produce similar results when administered parenterally as cyanocobalamin. Daily doses of the complex containing amounts of cobalamin of about 10 micrograms have been found fully effective when given orally in maintenance therapy.

This discovery is most unexpected in view of the widely held opinion that substances which have a high molecular weight such as the true proteins, and which are therefore non-dialysable, are required as the "intrinsic factor".

In addition to the clinical results obtained by the oral administration of the present complexes, they have also been found to be active in the maturation of megaloblastic cells, that is immature red cells from the bone marrow of pernicious anaemia patients, to normoblasts or mature and fully formed cells, in vitro. Pure crystalline cyanocobalamin requires the addition of normal gastric juice before it is effective as a maturing agent for megaloblastic cells from such sources (Callender and Lajtha, Blood (1951) 6, p. 1234).

The present invention comprises methods for the production of the complexes described above, and methods for the production of preparations containing these complexes either with or without intermediate recovery of the complexes.

As stated previously the cobalamin-peptide complexes are produced from fermentation broths and they are produced by a number of microorganisms when grown in a suitable medium. So far as is known, any organisms which will produce cobalamins by fermentation will produce them in a form of material from which the complexes of the present invention can be prepared. Various cobalamin-producing organisms are already well known in the art. The known suitable organisms are members of the group Fungi which consists of the sub-groups Myxomycetes, Schizomycetes and Eumyetes as defined, for example in "Industrial Mycology" by Smith and Raistrick, London, Arnold & Co. (1946) at pages 1 to 3.

In particular it has been found that members of the genera Streptomyces and Propionibacterium (the latter as defined in Bergey, "Manual of Determinative Bacteriology", 6th Edition, Waverley Press, Baltimore) provide good yields of the complexes, among which Streptomyces ATCC 11072, *Streptomyces griseus* and *Propionibacterium freudenreichii* have been found to be particularly suitable. These organisms are already widely used in industrial fermentations. *Propionibacterium shermanii* and *technicum* also give good yields of the complexes.

Whether any particular organism is cobalamin-producing may be determined by fermenting a suitable nutrient medium containing sources of assimilable nitrogen, carbon and cobalt, for example corn steep liquor, glucose and cobalt chloride respectively, and examining the fermented product for the presence of cobalamins. If cobalamins are found to be present then the suitability of the organism for the purposes of the present invention may be determined by preparing a cobalamin complex from the fermented product by the methods of the present invention, and subjecting the complex so prepared to clinical tests in the customary way. Alternatively, the complex may be tested for the various other properties mentioned above in order to make a preliminary determination of the suitability of the organism before proceeding to the stage of clinical tests.

In order to produce the complexes on a substantial scale it is preferred to carry out the fermentation with the selected organism under submerged conditions in a liquid medium. In the case of aerophilic organisms such as Streptomyces the fermentation medium requires aeration, but when certain species of Propionibacterium are used, for example *P. freudenreichii*, it has been found advantageous to maintain anaerobic conditions in the nutrient medium for the earlier part of the fermentation period, after which a restricted amount of air is beneficial.

If desired precursors may be added to the fermentation, preferably after some cell growth has occurred, in order to produce cobalamin-peptide complexes containing cobalamins other than cyanocobalamin. For example 5-hydroxybenzimidazole may be added to produce a complex containing the corresponding cobalamin, also known as Factor III.

The preparation process may include steps resulting in alteration of the type of cobalamin present: for instance, hydroxycobalamin may be converted into cyanocobalamin in known manner; but such steps form no part of the present invention and will not be further referred to.

It is known that cobalamins, for example cyanocobalamin and hydroxocobalamin, occur in the fermented product largely in a "bound" form. By this it is meant that the cobalamins are bound to high molecular weight protein-like material, and in this form the cobalamin is unavailable to most microorganisms, for example to the protozoan *Ochromonas malhamensis*, which is commonly used in the assay of the cobalamins. In this form the cobalamins are also ineffective against pernicious anaemia when taken orally.

The various steps of the known processes for the recovery of cyanocobalamin from fermentation broths result in the breakdown of the microbiologically unassayable cyanocobalamin-protein compound, the cobalamin group of which is said to be "bound" to the microbiologically assayable lower molecular weight cyanocobalamin-peptide complex, the cobalamin group of which is said to be "free", and finally to the "uncombined" cyanocobalamin of molecular weight 1350.

In order to obtain cobalamin-peptide complexes of the required molecular weight for the present invention the degradation of the "bound" cobalamins can be effected by the action of, for example, cyanide ions, proteolytic enzymes, acids or by heat. The degradation treatment may be carried out at any convenient stage after the fermentation has been completed, for example on the crude fermentation broth, or on extracts or concentrates thereof.

The fermentation broth containing the complex may be concentrated and purified by methods suitable for the concentration and purification in processes for the production of "uncombined" cyanocobalamin, but it is desirable in order to obtain a good yield of the complex that as a preliminary step the cells or mycelium of the organism used are treated at an acid pH value, to release the cobalamin-containing material from the cell substance. For example the cells or mycelia may be suspended in the fermented broth which has been adjusted to an acid pH, for example in the range 1 to 3, for a suitable period, and the cells or mycelia then filtered off and discarded.

Alternatively, the cells or mycelia may be separated from the fermented broth by filtration or by centrifuging and resuspended at the desired pH value until all cobalamin-containing material is released from the cell, after which insoluble cell material is removed and discarded.

The "bound" and "free" cobalamins obtained may then be purified and concentrated by adsorption from solution onto a suitable ion exchange resin. They are then eluted from the resin, for instance by acid isopropanol, and the eluate further concentrated and purified by known methods such as repeated extractions from aqueous solution into a phenol/benzene solution and re-extractions from this solvent mixture into water by the addition of n-butanol or butyl acetate.

It has been found desirable to purify and concentrate the solution until it contains a concentration of total cobalamins in the range 500 to 1500 micrograms per millilitre, for example about 1200 micrograms of cobalamins per millilitre, in aqueous solution. Total cobalamins may be estimated by microbiological assay after an aliquot of the solution has been subjected to heat at an acid pH value in aqueous solution until all "bound" cobalamin has been released or by spectroscopy, for example by light having a wavelength of 550 millimicrons.

The solution thus obtained will normally contain "bound" and "free" cyanocobalamin unless the fermentation has been carried out in the presence of a precursor, for example a benzimidazole, such as 5-hydroxy benzimidazole, when the corresponding cobalamin (Factor III) will be present in "bound" and "free" form, as well as cyanocobalamin. In order to increase the yield of "free" cyanocobalamin it may then be submitted to the partial degradation necessary to obtain a product of the desired molecular weight.

Alternatively, however, the step of degradation of the "bound" material may be carried out without first concentrating the material or even when the material is in the form of a suspension (particularly a re-suspension) of the fermented cells, in this case the solution of complex thus obtained may be separated and prepared for clinical use without substantial concentration or dilution.

One convenient method of degrading the "bound" cobalamin to a cobalamin-peptide complex of the desired molecular weight is by treatment of the aqueous concentrate with cyanide ions, for example by the addition of about 2% weight/volume potassium cyanide, for a suitable time, for example for about 1 to 2 hours at room temperature.

While the use of cyanide ions for the partial degradation of "bound" cobalamin is convenient in that the degredation is readily controlled, the process of the invention is not restricted to this method. Other means can also be used such as acid treatment or treatment with protelytic enzymes such as pepsin, trypsin, chrymotrypsin or papain. If desired the partial degredation may be effected by prolonging the treatment of the cells or mycelia at acid pH, described above, which is given in order to release "bound" cobalamin from the cell material, sufficiently to cause degradation of at least some of the "bound" cobalamin to a cobalamin-peptide complex of the desired molecular weight. Again, the necessary degradation may be achieved by heating the "bound" cobalamin, preferably in aqueous solution. The degradation may be accomplished at a suitably elevated temperature, for example above about 50° C. and preferably above about 80° C. It is even possible to obtain the necessary degree of degradation of part of the cobalamin-containing material by allowing the fermentation to proceed to the stage of autolysis of the fermenting organism, but such a method is inefficient and difficult to control and other methods are therefore preferred.

In order to decide when sufficient degradation has occurred dialysis tests may be carried out at intervals using membranes such as "cellophane" which are of suitable pore size after the removal of "uncombined" cobalamin, for example by adsorption onto charcoal as hereinafter described.

Additionally tests may be made with suitable microorganisms to see when their growth becomes stimulated.

The aqueous solution containing the complex of the required molecular weight may, if desired, be further concentrated or it may be treated at this stage with an inorganic or organic precipitant to obtain the desired cobalamin-peptide complex in the solid form.

Alternatively, this solution may be purified as required and used with or without further concentration for the making of liquid preparations for clinical use. For this purpose it is diluted at least until the concentration of cobalamin present as a complex is below 100 micrograms per millilitre and preferably until the concentration is below 10 micrograms per millilitre.

The precipitant which is added to the aqueous concentrate of the cobalamin-peptide complex may be any suitable agent used for the purpose of salting out organic compounds from aqueous solution, for example inorganic salts such as ammonium, sodium or potassium sulphate. The salting out agent is suitably added in sufficient quantity to provide an aqueous solution in the range 25% to fully saturated, and preferably in the range about 50% to 70% in the case of ammonium sulphate. The complex may also be precipitated by the addition of organic precipitants such as acetone, propanol, or isopropanol.

If the pure cobalamin-peptide complex is required, any "uncombined" cobalamins are removed after the separation stage so that those which have been released from the complex during its concentration and separation will be removed, together with those previously formed, in a single extraction. If desired, however, "uncombined" cobalamins may be removed before the separation stage, and the impure complex will still be capable of clinical use. It is however preferred to isolate the pure complex (or at least a solid containing the complex free from uncombined cobalamin) and make clinical preparations from that, in order to simplify standardisation and assay of the preparation, which are complicated by the presence of "uncombined" cobalamin. There are similar objections to the presence of major amounts of "bound" cobalamin, but it will be appreciated that the method of preparation described avoids substantial contamination with bound cobalamin.

One suitable method of removing "uncombined" cobalamins is by treatment of the solution containing them with activated carbon. The amount of carbon used will depend to some extent on the amount of "uncombined" cobalamins present but it has been found suitable to add an amount equal to about 2% weight/volume of the solution. The cabalamin is adsorbed on the carbon, the complex remaining in solution. This treatment also removes coloured impurities and the appearance of the complex is thus improved.

The solid complex after precipitation may be further purified, for example, by redissolving in water and by washing with organic solvents such as butanol and/or benzene, followed by removal of the organic solvents by distillation. The complex may then be reprecipitated and separated. These processes may be repeated until solid cobalamin complex of the desired purity is obtained.

The following examples illustrate methods of preparing cobalamin-peptide complex from fermentation broths according to the invention. In the examples the terms "parts by weight" and "parts by volume" bear the same relation to each other as do grams to millilitres.

EXAMPLE 1

Broth from the fermentation of a nutrient medium containing soya bean meal, glucose, dihydrogen potassium phosphate and cobalt chloride by the organism Streptomyces ATCC 11072 was acidified to pH 2 for 1 hour, and then filtered. The filtrate was passed over an ion exchange resin which adsorbed the "bound" cobalamins, "uncombined" cobalamins consisting of cyanocobalamin with some hydroxocobalamin, and any peptide complex which had been formed. These adsorbed substances are hereinafter referred to as "cobalamins."

The adsorbed cobalamins were then eluted from the resin with acid isopropanol and the eluate neutralised. The eluate was then concentrated by distillation under reduced pressure to remove isopropanol and the concentrate obtained was adjusted to a pH value of 7 to 7.5. 2% w/v potassium cyanide was then added and the mixture allowed to stand. The resulting mixture was treated with a mixture of phenol and benzene (30/70% volume/volume) to extract the cobalamins. The resulting solution of the cobalamins in the phenol/benzene was then treated with water and n-butanol whereby the cobalamins were re-extracted into aqueous solution.

The aqueous solution contained approximately 1260 micrograms per millilitre of total cobalamins, that is "bound," "uncombined" and "free" (as the peptide complex).

To 3.2 parts by volume of the resulting solutions were added 2.5 parts by weight of ammonium sulphate and the mixture was allowed to stand. An oily layer and a precipitate separated out, and these were removed and mixed with water. The mixture, which formed an emulsion, was then washed with benzene to remove traces of organic solvents such as phenol and butanol. The washed emulsion was then treated with activated carbon to remove some impurities and "uncombined" cyanocobalamin. The carbon was then filtered off and washed with water and the washings added to the filtrate. The purified aqueous solution of cyanocobalamin-peptide complex thus obtained was washed with n-butanol and then with benzene, and the complex was precipitated from the washed aqueous solution by the addition of sufficient ammonium sulphate to give a concentration of 60 grams per 100 ml. of solution. The precipitate was redissolved and reprecipitated twice more in a similar manner and the solid cyanocobalamin-peptide complex finally obtained was air dried.

On spectroscopic examination by light of wavelength in the visible and ultra violet range the spectrum shown in FIGURE 1 was obtained. The spectra of cyanocobalamin and an aqueous concentration containing cyanocobalamin mostly in the "bound" form are also given in this figure for comparison.

The complex was also examined spectrophotometrically by light having a wavelength of 550 millimicrons and the cyanocobalamin content then calculated. Ammonium sulphate in the complex was also estimated and the remaining peptide portion thus calculated by difference. By this means the complex was found to contain 5.5% cyanocobalamin and 37.6% peptide. From these figures and on the assumption that there is a molecular ratio of 1:1 of cyanocobalamin and peptide in the complex and that the molecular weight of cyanocobalamin is 1350, the molecular weight of the complex is calculated to be about 10,500.

A sample of the complex was examined in the ultra centrifuge at $5.98 \times 10^4$ revolutions per minute for 320 minutes and was shown to have an uncorrected sedimentation constant of about $0.44 \times 10^{-13}$ Svedberg units indicating a molecular weight of about the same order as that calculated.

EXAMPLE 2

Broth containing cells obtained by the fermentation of a medium containing corn steep liquor, glucose and cobalt chloride with a strain of *Propionibacterium freudenreichii* was acidified to pH 2 with sulphuric acid and allowed to stand for 6 hours to release the cobalamins as the cyanocobalamin-peptide complex from insoluble cell material. Insoluble material was then filtered off and the filtrate treated with a phenol/benzene mixture to extract the complex. The resulting solution was then treated with butyl acetate and water whereupon the complex was extracted into aqueous solution. This process was repeated until an aqueous concentrate containing a total of 620 micrograms/millilitre of cyanocobalamin was obtained, mostly in the form of a peptide complex.

This concentrate was then treated with activated carbon to remove impurities and "uncombined" cyanocobalamin itself. After filtering off the carbon the filtrate was extracted with butanol and washed with toluene to remove dissolved butanol. The aqueous concentrate was distilled under reduced pressure to remove traces of toluene and re-treated with active carbon after which the carbon was filtered off.

To 9.4 parts of this aqueous concentrate were added 7.15 parts of ammonium sulphate and the precipitate filtered off. The precipitate was re-dissolved in water and reprecipitated twice more under similar conditions and finally air dried.

A portion of the complex was then re-dissolved in water and subjected to ultra filtration through an "Oxoid" membrane having an average pore size of 5000 to 10,000 Angstrom units. Some high molecular weight impurity was left behind on the filter.

EXAMPLE 3

To an aqueous solution of the complex prepared as described in Example 2 and containing 500 micrograms of cyanocobalamin per millilitre potassium cyanide was added to give a concentration of 2% w/v at a pH value of 7 to 7.5. Ammonium sulphate was then added to provide a concentration of 12% w/v and the complex was extracted into normal butanol. Toluene and water were then added and the complex re-extracted into aqueous solution. The aqueous solution thus produced was treated with a mixture of phenol and toluene until all the complex was extracted into the organic phase. The complex was then concentrated by re-extraction into aqueous solution by the addition of acetic acid, butanol and water. The aqueous solution was separated and further concentrated by distillation under reduced pressure, thus removing excess solvent and cyanide.

Analysis of the complex obtained showed that it contained 13.2% cyanocobalamin and 86.8% of peptide giving a molecular weight of 10,250 as shown in the table in column 2 of this specification.

Chromatographic and electrophoretic examination of the complex showed that substantially all the cyanocobalamin was in the form of a peptide complex. It had the adsorption spectrum shown in FIGURE 2.

Some of the complex when blended with mannitol provided to be quite palatable and very active in alleviating symptoms of pernicious anaemia as described in Example 7.

A portion of the complex was further purified by the addition of 25 volumes of acetone to an aqueous solution of the complex having the analysis shown above, when a pink powder was precipitated which was allowed to dry in air.

The precipitate so obtained contained 15.8% cyanocobalamin and 84.2% of peptide giving a molecular weight of about 8,600 by the method previously described.

The absorption spectrum of this material is also shown in FIGURE 2.

Elemental analysis gave the following results: carbon 49.8%; hydrogen 6.9%; nitrogen 12.5%; sulphur 0.96%; phosphorus 0.62%; cobalt 0.60%.

EXAMPLE 4

An aqueous solution containing cyanocobalamin peptide complex was prepared from a broth obtained by the fermentation of a nutrient medium by Streptomyces ATCC 11072 by acidification to pH 2, with subsequent purification and concentration by extraction and re-extraction with organic solvents and water and treatment with carbon. To 9.4 parts by volume of this aqueous solution 6 parts by weight of ammonium sulphate were added slowly with stirring and the precipitate which separated out was removed. The precipitate was then re-dissolved in water and reprecipitated by the addition of 70 grams of ammonium sulphate to every 100 millilitres of solution.

The complex was further purified by re-dissolving in water, and treating the resulting solution with 2% potassium cyanide at pH 7 for 1 hour after which the dicyanocobalamin peptide complex which was now present was extracted into butanol in the presence of 12% ammonium sulphate. The dicyano-complex was then re-extracted into water by the addition of water and toluene. The enriched aqueous solution of the dicyano-complex was treated with phenol/toluene (30%/70% v/v) to extract this complex which was then re-extracted into water after acidification with glacial acetic acid. The aqueous solution of cyanocobalamin peptide complex so obtained was then distilled under reduced pressure to remove cyanide ions and solvents.

Analysis of the solution thus prepared showed the complex to contain 14.1% cyanocobalamin and 85.9% peptide, giving a molecular weight of about 9,550.

A portion of the complex, when blended with mannitol was quite palatable and was very effective in causing remission of the symptoms of pernicious anaemia as described in Example 8.

The remainder of the complex in aqueous solution was precipitated by the addition of 25 volumes of acetone to 1 volume of aqueous solution. The precipitated pink powder when air dried had the following analysis: cyanocobalamin 29.3%; peptide 70.7%; giving a molecular weight of 4,600.

Elemental analysis of the acetone precipitate gave the following results: carbon 45.3%; hydrogen 7.1%; nitrogen 12.55%; sulphur 1.43%; phosphorus 0.33%; cobalt 1.37%. The absorption spectra are shown in FIGURE 3.

EXAMPLE 5

Broth from the fermentation of a nutrient medium containing corn steep liquor, glucose and cobalt chloride by a strain of *Propionibacterium freudenreichii* was adjusted to pH 2 and allowed to stand for 6 hours after which it was purified and concentrated by extraction into organic solution followed by re-extraction into aqueous solution to give an aqueous solution of "bound" cobalamins, "free" cobalamins and "uncombined" cobalamins. The pH of the aqueous solution was then adjusted to a value between pH 7 and 7.5 and 2% weight/volume of potassium cyanide added, and the solution allowed to stand for 3 hours after which the cobalamin peptide was extracted into organic solution and re-extracted into aqueous solution. The aqueous solution was then adjusted to a pH value of 4.5 and the solution concentrated to remove cyanide ions and organic solvents. The resulting enriched aqueous solution was adjusted to a volume of 40 gallons containing 500 micrograms of cyanocobalamin/millilitre as the peptide complex and as "uncombined" cyanocobalamin.

Ammonium sulphate was added with agitation to give a concentration of 60 grams per 100 millilitres of solution, and the precipitate formed allowed to settle for 12 hours after which it was removed by filtration and dried in air. The precipitate weighed 766 grams.

Analysis showed the material to contain 13.4% cyanocobalamins and 67.5% peptide, the remaining 19.1% being ammonium sulphate, thus giving a molecular weight of about 8,100.

EXAMPLE 6

The cyanocobalamin-peptide complex prepared as in Example 1 which contained about 13% by weight of cyanocobalamin was blended with mannitol to give a concentration of 0.16% of the complex, and doses of this formulation were given orally to six patients suffering from pernicious anaemia. The patients had undergone no other treatment.

Normal values for red blood cell counts in healthy persons vary between about 4.5 and $5.0 \times 10^6$ red blood cells per cubic millimetre and for the haemoglobin level between about 90 and 100.

Case 1

A patient was given orally an initial daily dose of the formulation containing 780 micrograms of the complex (containing 100 micrograms of cyanocobalamin) for 8 days, after which the amount given daily was reduced to half this amount for the next 14 days. The daily dose was then reduced to an amount of the formulation containing 78 micrograms of the complex (equivalent to 10 micrograms of cyanocobalamin) for the remaining period of treatment (263 days), and the patient has been maintained on this daily dose in good health and without symptoms of pernicious anaemia.

Figure 4:
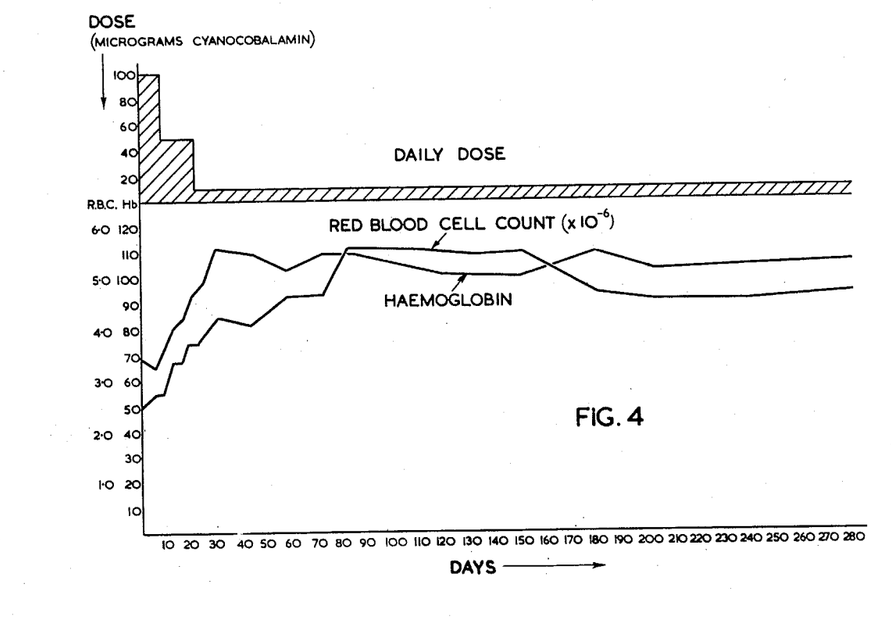

Counts of red blood cells and estimations of the haemoglobin level have been obtained throughout the period and are shown in FIGURE 4.

Case 2

A patient was given an initial daily dose of the formulation containing 780 micrograms of the complex for 8 days after which the dose was reduced to half this amount daily for the next 14 days.

In view of the age of the patient (72 years) an amount of the formulation containing 156 micrograms of the complex (equivalent to 20 micrograms of cyanocobalamin) was given daily for the next 77 days, after which this amount was reduced to half for the remaining period of treatment (155 days).

The patient has been maintained in good health and free from symptoms of pernicious anaemia.

Figure 5:
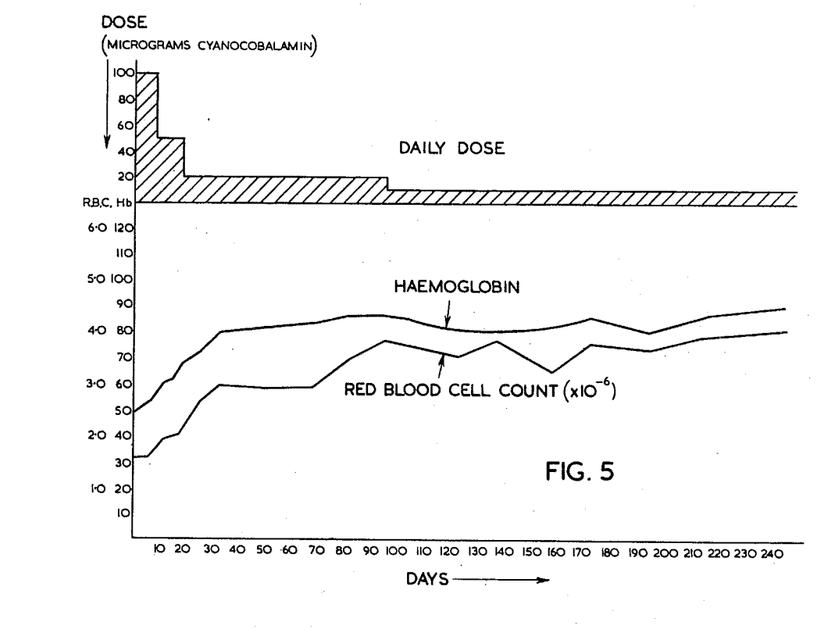

Counts of red blood cells and estimations of the haemoglobin level have been obtained throughout treatment and are shown in FIGURE 5.

In view of the age of the patient, response to treatment, as judged by red blood cell counts and estimations of haemoglobin level was slower than in the other cases described in this specification.

*Case 3*

A patient received orally an amount of the formulation containing 780 micrograms of the complex daily for 8 days after which the amount was reduced to one-fifth of this amount daily for the next 22 days, followed by a further reduction to one half the latter amount for the next 41 days. At this point treatment was discontinued.

After 35 days without treatment the patient's condition began to deteriorate, as shown by a decrease in the number of red blood cells and in the haemoglobin level.

A single dose of the formulation containing 1560 micrograms of the complex (equivalent to 200 micrograms of cyanocobalamin) was given on the 60th day after treatment had ceased and 14 days after this the patient was placed on a daily maintenance dose of the formulation containing 78 micrograms of the complex. The patient has been maintained in good health and without symptoms of pernicious anaemia for the remaining period of treatment (105 days).

Figure 6:
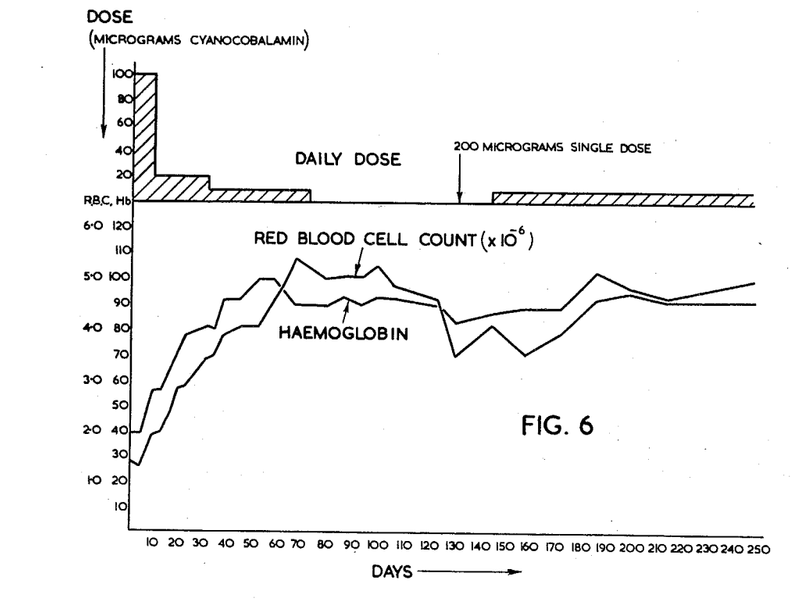

Red blood cell counts and estimations of haemoglobin level are shown in FIGURE 6.

*Case 4*

A patient was given orally an amount of the formulation containing 780 micrograms of the complex daily for 7 days, after which the amount was reduced to one tenth of this amount for the remaining period of treatment (207 days).

The patient has remained in good health and free from symptoms of pernicious anaemia.

Figure 7:
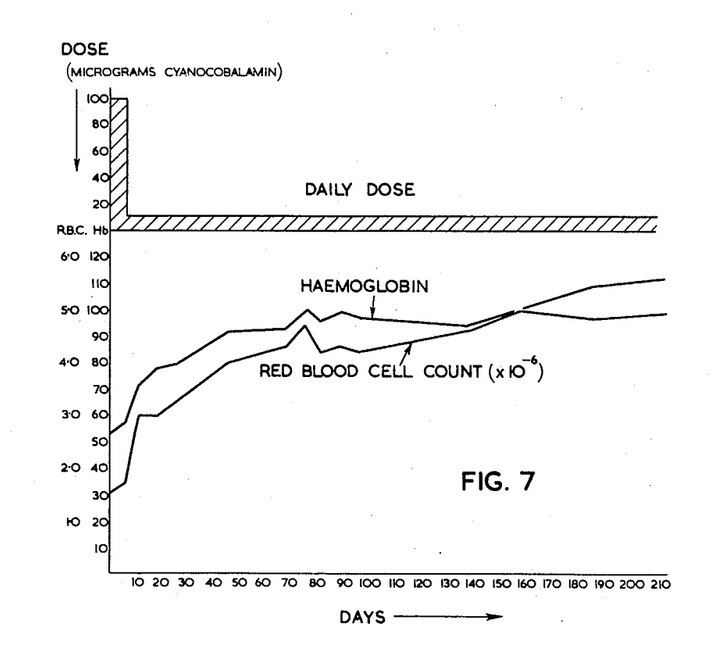

Red blood cell counts and estimations of the haemoglobin level are shown in FIGURE 7.

*Case 5*

A patient received orally an amount of the formulation containing 780 micrograms of the complex daily for 8 days after which the amount was reduced to half this amount for the next 7 days followed by a further reduction to one fifth of the initial amount for 5 days. At the end of this period the amount of the formulation given was reduced to an amount daily containing 78 micrograms of the complex for the remaining period of treatment (204 days).

The patient has been maintained in good health and free from symptoms of pernicious anaemia.

Figure 8:
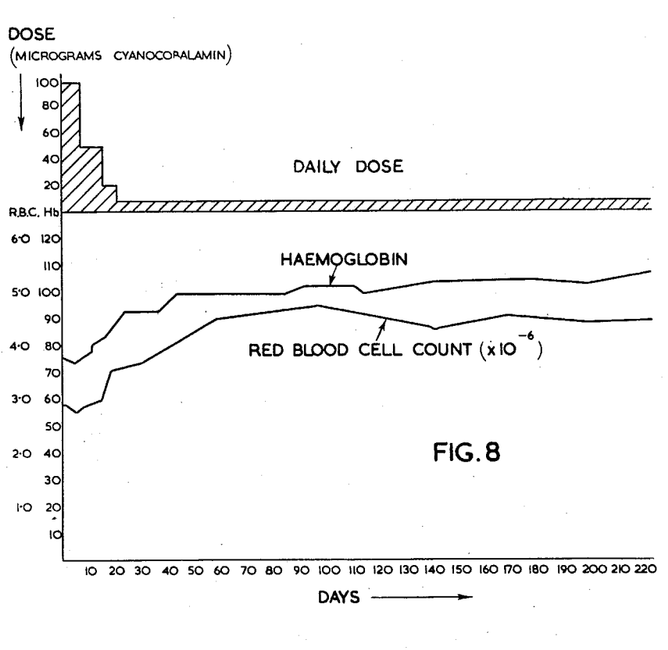

Red blood cell counts and estimations of the haemoglobin level are given in FIGURE 8.

EXAMPLE 7

A patient was treated with a formulation consisting of the complex produced by the method described in Example 3 mixed with mannitol in proportions of about 1 to 600. An amount of the formulation which contained 760 micrograms of the complex (equivalent to 100 micrograms of cyanocobalamin) was given orally for 7 days, after which the amount was reduced to half daily for the next 5 days. It was finally reduced to an amount of the formulation containing 76 micrograms of the complex daily and the dose has been maintained at this level for the remaining period of treatment (80 days).

The patient has been maintained in good health and free from symptoms of pernicious anaemia.

Figure 9:
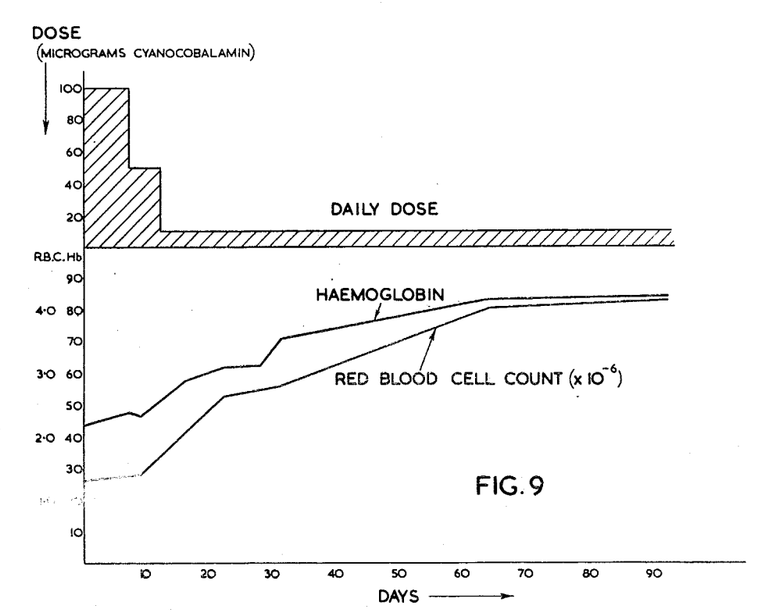

Red blood cell counts and estimations of the haemoglobin level have been obtained and are shown in FIGURE 9.

EXAMPLE 8

A patient was treated orally with a formulation consisting of the complex prepared by the method described in Example 4 mixed with mannitol. An amount of the formulation which contained 710 micrograms of the complex (equivalent to 100 micrograms of cyanocobalamin) was given orally for 7 days after which the amount was reduced to an amount equal to 142 micrograms of the complex for the next 11 days. It was finally reduced to 71 micrograms for the remaining period of treatment (82 days).

Figure 10:
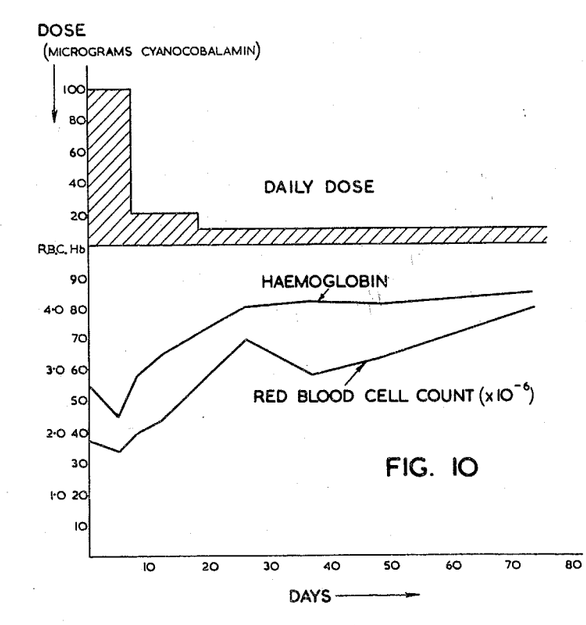

Red blood cell counts and estimations of haemoglobin level are shown in FIGURE 10.

Response to treatment has been similar to that described for Example 7.

EXAMPLE 9

A patient aged 52 years had been treated with a proprietary oral preparation for the treatment of pernicious anaemia for sixteen months during which time she responded well as judged from blood counts and haemoglobin level estimations and was maintained in good health.

At the end of this period, in spite of continued treatment the patient began to experience difficulty in standing and walking associated with numbness of the feet, and lack of sensation over both ankles. Knee and ankle reflex movements were sluggish and plantar reflexes not clearly demonstrable. The patient was also unable to notice the touch of cotton wool to the soles of the feet.

These symptoms persisted in spite of the fact that the red blood cell count was adequate at $4.3 \times 10^6$ red blood cells per cubic millimetre and the haemoglobin level was 94% and were diagnosed as resulting from sub-acute combined degeneration of the spinal cord which is known to occur in a proportion of patients suffering from pernicious anaemia.

The patient's treatment was changed to oral treatment with a formulation comprising cyanocobalamin-peptide complex as prepared in Example 1 mixed with mannitol.

In the first 7 days the patient was given daily amounts of the formulation containing an amount of the complex containing 300 micrograms of cyanocobalamin. Thereafter, the daily amount given was reduced to a quantity of the formulation containing 200 micrograms of cyanocobalamin for 8 weeks.

During the treatment walking improved, and the sensory symptoms disappeared and the values for red blood cell counts and haemoglobin level were maintained throughout.

EXAMPLE 10

It is known that crystalline cyanocobalamin alone does not cause the maturation of megaloblastic (immature) red cells from the bone marrow of patients suffering from pernicious anaemia to normoblasts (mature cells) in vitro, for example see Callender and Lajtha, Blood (1951) 6, p. 1234.

It has been found, however, that the cyanocobalamin-peptide complexes of the present invention cause a maturation of such cells to take place in vitro.

Tests were carried out on cultures of megaloblastic cells from the bone marrow of two patients suffering from pernicious anaemia using the method described by Callender and Lajtha, Blood (1951) 6, p. 1234 with the exception that Ringer's solution was used instead of Gey's and 50 units of penicillin were added to prevent infection during the test.

7.8 micrograms of cyanocobalamin-peptide complex prepared as in Example 1 and containing 1 microgram cyanocobalamin, was used in the test and the results shown in the following table obtained.

| Patient No. | Initial count on cells from bone marrow | | Counts after 18 hr. culture in homologous serum in presence of cyanocobolamin-peptide complex | |
|---|---|---|---|---|
| | Megaloblasts, percent | Normoblasts, percent | Megaloblasts, percent | Normoblasts, percent |
| 1 | 94 | 6 | 55 | 46 |
| 2 | 90 | 10 | 35 | 65 |

I claim:

1. A process of producing a cobalamin-peptide complex wherein a suitable nutrient medium is fermented with a cobalamin-producing organism and thereafter subjecting a product of the fermentation containing bound cobalamin-protein complex in solution to the action of a degrading agent and continuing such action until the molecular weight of the degraded product constituting the cobalamin-peptide complex is below about 15,000 but substantially above that of uncombined cobalamin, to produce a product which is effective against pernicious anemia upon oral administration.

2. A process of producing a complex as claimed in claim 1 wherein the degradation comprises treatment of the fermentation product with cyanide ions.

3. A process of producing a cobalamin peptide complex as claimed in claim 1 wherein the product of the fermentation is purified and concentrated to produce an aqueous solution containing a concentration of total cobalamins in the range 500 to 1500 micrograms per millilitre and thereafter recovering the complex in the solid form by the addition of a precipitant selected from the group consisting of ammonium sulphate and acetone, and purifying the complex so recovered.

4. A process of producing a preparation containing a cobalamin-peptide complex as claimed in claim 1 comprising recovering a solid material from the product of microbial fermentation after degradation consisting predominantly of cobalamin-peptide complex which is effective on oral administration against pernicious anaemia and which is substantially free from toxic material and uncombined cobalamin, and thereafter diluting such material.

References Cited in the file of this patent

UNITED STATES PATENTS

| 2,446,974 | Chow | Aug. 10, 1948 |
| 2,530,416 | Wolf | Nov. 21, 1950 |
| 2,576,932 | Garibaldi | Dec. 4, 1951 |
| 2,595,499 | Wood | May 6, 1952 |
| 2,646,386 | Miner | July 21, 1953 |
| 2,709,669 | Shafer et al. | May 31, 1955 |
| 2,764,521 | Leviton | Sept. 25, 1956 |
| 2,796,383 | Robinson | June 18, 1957 |
| 2,823,167 | Newmark | Feb. 11, 1958 |
| 2,835,627 | Conine | May 20, 1958 |
| 2,842,540 | Perlman | July 8, 1958 |
| 2,850,491 | Riehen | Sept. 2, 1958 |
| 2,892,754 | Lens | June 30, 1959 |
| 2,917,436 | Baker et al. | Dec. 15, 1959 |

FOREIGN PATENTS

| 665,485 | Great Britain | Jan. 23, 1952 |
| 496,632 | Canada | Oct. 6, 1953 |

OTHER REFERENCES

Lewis et al.: J. Biol. Chem., Vol. 199, No. 2, December 1952, pages 517–530.